US011861958B2

(12) United States Patent
Cöster et al.

(10) Patent No.: US 11,861,958 B2
(45) Date of Patent: *Jan. 2, 2024

(54) MECHANISMS, ASSEMBLIES AND ELECTRONIC LOCKING SYSTEM

(71) Applicant: ASSA ABLOY AB, Stockholm (SE)

(72) Inventors: Anders Cöster, Stockholm (SE); Daniel Skarp, Sundbyberg (SE); Robin Mcgougan, Bollnäs (SE); Henrik Svensson, Spånga (SE); Bernt Arbegard, Järfälla (SE)

(73) Assignee: ASSA ABLOY AB, Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/978,412

(22) Filed: Nov. 1, 2022

(65) Prior Publication Data
US 2023/0055709 A1    Feb. 23, 2023

Related U.S. Application Data

(63) Continuation of application No. 16/347,464, filed as application No. PCT/EP2017/077983 on Nov. 1, 2017, now Pat. No. 11,514,734.

(30) Foreign Application Priority Data
Nov. 7, 2016 (EP) .................. 16197535

(51) Int. Cl.
G07C 9/00 (2020.01)
H02K 7/02 (2006.01)
H02K 7/18 (2006.01)

(52) U.S. Cl.
CPC .......... G07C 9/00174 (2013.01); H02K 7/02 (2013.01); H02K 7/1853 (2013.01); G07C 2009/00388 (2013.01); G07C 2009/00634 (2013.01)

(58) Field of Classification Search
CPC ...... G07C 9/00174; G07C 2009/00388; G07C 2009/00634; H02K 7/02; H02K 7/1853;
(Continued)

(56) References Cited

U.S. PATENT DOCUMENTS 1,048,628 A    12/1912  Woolsey
5,553,472 A     9/1996  Jasper
(Continued)

FOREIGN PATENT DOCUMENTS

CN    203130392    8/2013
CN    104812978    7/2015
(Continued)

OTHER PUBLICATIONS

International Search Report and Written Opinion for International (PCT) Patent Application No. PCT/EP2017/077983, dated May 15, 2018, 17 pages.
(Continued)

Primary Examiner — Nam V Nguyen
(74) Attorney, Agent, or Firm — Schwegman Lundberg & Woessner, P.A.

(57) ABSTRACT

Release mechanism for an electronic locking system, wherein the release mechanism is configured such that an input member and an output member are locked against relative rotation and can rotate together within a locking ring opening when a locking member is located in an input member recess and in an output member recess, and such that the output member is released to rotate relative to the input member when the locking member is located in the output member recess and in a locking ring recess. A freewheel mechanism and assemblies for an electronic locking system are also provided.

15 Claims, 7 Drawing Sheets

(58) Field of Classification Search
CPC . H02K 7/18; E05B 2047/0062; E05B 13/005; E05B 3/065; E05B 47/0001
USPC .............................................. 340/5.7; 70/275
See application file for complete search history.

(56) References Cited

U.S. PATENT DOCUMENTS

| | | | |
|---|---|---|---|
| 5,640,863 A * | 6/1997 | Frolov ................ | E05B 47/0692 70/277 |
| 5,813,261 A * | 9/1998 | Boehlow ................ | E05B 33/00 70/381 |
| 6,837,081 B2 * | 1/2005 | Ruano Aramburu ....................... | E05B 47/0692 70/222 |
| 7,073,359 B2 * | 7/2006 | San Jose Santamarta ................... | E05B 47/0619 292/144 |
| 8,456,277 B2 | 6/2013 | Gillert et al. | |
| 8,746,760 B2 * | 6/2014 | Chen ...................... | E05B 3/065 292/357 |
| 9,850,686 B2 | 12/2017 | Carlsson | |
| 10,202,784 B2 * | 2/2019 | Parker ..................... | E05B 1/003 |
| 10,316,544 B2 * | 6/2019 | Mitchell ................ | E05B 15/02 |
| 11,514,734 B2 | 11/2022 | Coster et al. | |
| 2002/0139156 A1 | 10/2002 | Aramburu et al. | |
| 2006/0048552 A1 | 3/2006 | San Jose Santamarta | |
| 2013/0088024 A1 | 4/2013 | Mackle | |
| 2013/0229021 A1 * | 9/2013 | Wang ..................... | E05B 3/065 292/336.3 |
| 2014/0007631 A1 * | 1/2014 | Wood .................... | E05B 63/044 70/357 |
| 2014/0225375 A1 | 8/2014 | Chang | |
| 2016/0017634 A1 | 1/2016 | Parker et al. | |
| 2016/0251876 A1 | 9/2016 | Carlsson | |
| 2019/0257116 A1 | 8/2019 | Cöster et al. | |

FOREIGN PATENT DOCUMENTS

| | | |
|---|---|---|
| DE | 102012110484 | 6/2014 |
| DE | 102014104271 | 8/2015 |
| EP | 0907815 | 4/1999 |
| EP | 0907815 | 11/2001 |
| EP | 1310618 | 5/2003 |
| EP | 3318703 | 5/2018 |
| EP | 3318703 | 9/2022 |
| EP | 4089251 | 11/2022 |
| FR | 2728613 | 6/1996 |
| FR | 2962472 | 1/2012 |
| JP | 2000-204806 | 7/2000 |
| KR | 20-2008-0002595 | 7/2008 |
| WO | WO 2007/008694 | 1/2007 |
| WO | WO 2007/089135 | 8/2007 |
| WO | WO 2016/175196 | 11/2016 |
| WO | 2018083133 | 5/2018 |
| WO | 2018083133 | 6/2018 |

OTHER PUBLICATIONS

Official Action with English Translation for China Patent Application No. 201780068427.7, dated May 11, 2020, 15 pages.
Official Action with English Translation for China Patent Application No. 201780068427.7, dated Nov. 17, 2020, 14 pages.
Extended Search Report for European Patent Application No. 16197535.4, dated Jul. 21, 2017, 17 pages.
Extended Search Report for European Patent Application No. 22180352.1, dated Oct. 13, 2022, 8 pages.
Official Action with English Translation for Korea Patent Application No. 10-2019-7013118, dated Sep. 26, 2021, 13 pages.
Official Action for U.S. Appl. No. 16/347,464, dated Mar. 28, 2022 12 pages.
Notice of Allowance for U.S. Appl. No. 16/347,464, dated Aug. 3, 2022 8 pages.
"International Application Serial No. PCT EP2017 077983, Invitation to Pay Additional Fees dated Mar. 23, 2018", 9 pgs.
"International Application Serial No. PCT EP2017 077983, International Preliminary Report on Patentability dated May 16, 2019", 10 pgs.
"U.S. Appl. No. 16/347,464, Preliminary Amendment filed May 3, 2019", 5 pgs.
"U.S. Appl. No. 16/347,464, Response filed Jun. 27, 2022 to Non Final Office Action dated Mar. 28, 2022", 8 pgs.
"U.S. Appl. No. 16/347,464, Notice of Allowance dated Oct. 31, 2022", 2 pgs.
"European Application Serial No. 16197535.4, Partial European Search Report dated May 12, 2017", 10 pgs.
"European Application Serial No. 16197535.4, Response filed Oct. 29, 2018 to Extended European Search Report dated Jul. 21, 2017", 13 pgs.
"European Application Serial No. 16197535.4, Intention to Grant dated Sep. 27, 2021", 50 pgs.
"European Application Serial No. 16197535.4, Response filed Dec. 13, 2021 to Intention to Grant dated Sep. 27, 2021", 37 pgs.
"European Application Serial No. 16197535.4, Intention to Grant dated Jan. 27, 2022", 49 pgs.
"European Application Serial No. 16197535.4, Response filed May 25, 2022 to Intention to Grant dated Jan. 27, 2022", 7 pgs.
"European Application Serial No. 22180352.1, Response filed Oct. 26, 2022 to Extended European Search Report dated Oct. 13, 2022", 46 pgs.

* cited by examiner

MECHANISMS, ASSEMBLIES AND ELECTRONIC LOCKING SYSTEM

CROSS REFERENCE TO RELATED APPLICATIONS

This application is a continuation of U.S. patent application Ser. No. 16/347,464 filed on May 3, 2019, now U.S. Pat. No. 11,514,734, which is a national stage application under 35 U.S.C. 371 and claims the benefit of PCT Application No. PCT/EP2017/077983 having an international filing date of Nov. 1, 2017, which designated the United States, which PCT application claimed the benefit of European Patent Application No. 16197535.4 filed Nov. 7, 2016, the disclosure of each of which is incorporated herein by reference.

TECHNICAL FIELD

The present disclosure generally relates to mechanisms and assemblies for electronic locking systems. In particular, a release mechanism, a freewheel mechanism and assemblies for electronic locking systems are provided.

BACKGROUND

Various types of electronic locking systems are known. Instead of utilizing a purely mechanical lock, some locking systems include an electronic drive of a lock member (e.g. a lock bolt) to unlock, for example, a door to give access to the area behind the door.

Furthermore, instead of utilizing a traditional key to unlock the door, various types of electronic communication methods for authorizing a person to access the area behind the door are known. For example, a Radio Frequency Identification (RFID) system may be used where a reader of the RFID system is installed in the door and a tag is carried by or attached to an object to be identified.

In order to power an electronic locking system, so called "self-powered" electronic locking systems have been proposed, where electricity is generated by a mechanical actuation of a door handle and is used to power the electronic locking system. This concept is also known as energy harvesting.

US 2014/0225375 A1 discloses a power supply device for a door handle. By turning a door handle to move a latch, a rotation shaft of the door handle is driven to turn a drive gear. The rotation of the drive gear is transmitted to a rotation of a generator shaft to generate power for an electric lock. Drawbacks of the device in US 2014/0225375 A1 include a low energy efficiency and a bulky structural design which makes the device complicated to install in a door.

SUMMARY

One object of the present disclosure is to increase energy efficiency of an electronic locking system.

A further object of the present disclosure is to provide an electronic locking system having a compact design.

A further object of the present disclosure is to provide a release mechanism for an electronic locking system that has a compact design.

A further object of the present disclosure is to provide a release mechanism for an electronic locking system with reduced mechanical losses.

A further object of the present disclosure is to provide a release mechanism for an electronic locking system that can contribute to an improved energy efficiency of the remainder of the electronic locking system, for example of an electric generator.

A further object of the present disclosure is to provide a release mechanism for an electronic locking system that has a simple (e.g. cheap) and reliable design and function.

A further object of the present disclosure is to provide a freewheel mechanism with increased energy efficiency.

A further object of the present disclosure is to provide a freewheel mechanism with reduced mechanical losses.

A further object of the present disclosure is to provide assemblies for an electronic locking system that improve energy efficiency.

A further object of the present disclosure is to provide assemblies for an electronic locking system that enable a compact design of the electronic locking system.

According to one aspect, there is provided a release mechanism for an electronic locking system, the release mechanism comprising a locking member; an input member arranged to rotate about a rotational axis, the input member having an input member recess for partly accommodating the locking member and an input member opening; an output member arranged in the input member opening and arranged to rotate about the rotational axis, the output member having an output member recess for partly accommodating the locking member; and a locking ring having a locking ring opening for accommodating the input member and a locking ring recess for partly accommodating the locking member; wherein the release mechanism is configured such that the input member and the output member are locked against relative rotation and can rotate together within the locking ring opening when the locking member is located in the input member recess and in the output member recess, and such that the output member is released to rotate relative to the input member when the locking member is located in the output member recess and in the locking ring recess.

In contrast to prior art solutions where an output member is released based at a specific tension, e.g. in a spring, the release mechanism according to the present disclosure releases the output member at a specific angular position. In other words, the release mechanism provides a position release instead of a tension release. In this manner, any force dedicated to the release, i.e. which is not transmitted by the output member, can be reduced or eliminated. Thereby, the release by the release mechanism can be triggered more easily, e.g. by manual actuation of a handle. Moreover, the energy efficiency of the release mechanism is improved.

A further advantage of the release mechanism is that it enables the output member to be released with the same force at all times. For example, if the input member is actuated by a door handle, the output member will be released with the same force regardless of whether the door handle is actuated fast or slow, including extremely slow actuations.

Furthermore, in contrast to a solution where a gear is provided to change (e.g. increase) a rotational speed of an output member from a rotational speed of an input member, the release mechanism provides for a gearless design since the input member and the output member are rotationally locked when the locking member is located in the input member recess and in the output member recess.

The output member, the input member and the locking ring may be arranged such that the output member recess, the input member recess and the locking ring recess are aligned in a plane perpendicular to the rotational axis. The input member recess and the output member recess may have a circumferential extension substantially corresponding to (e.g. slightly larger than) the dimension of the locking member. The locking ring recess may have the same circumferential extension. Alternatively, the locking ring recess may be wider than the input member recess and the output member recess in the circumferential direction. In any case, the locking ring recess may comprise a slanted or curved end surface such that the locking member can be pushed radially inwardly by rotating the locking ring relative to the input member.

The release mechanism according to the present disclosure may comprise a plurality of locking members (e.g. two or three) and a corresponding amount of input member recesses, output member recesses and locking ring recesses. A higher number of locking members decreases the surface load on each locking member.

The locking member may be biased radially outwardly away from the output member recess, for example by a biasing member, such as a spring or magnets. Alternatively, the output member recess may comprise a slanted surface such that the locking member is forced radially outwardly when the output member is rotated relative to the input member. Alternatively, or in addition, the release mechanism may be configured such that the locking member falls out from the output member recess by means of gravity.

The sum of the radial (with respect to the rotational axis) extension of the output member recess and the radial extension of the input member recess may substantially conform to the radial extension of the locking member. Also the sum of the radial extension of the input member recess and the radial extension of the locking ring recess may substantially conform to the radial extension of the locking member. For example, each radial extension of the output member recess, input member recess and locking ring recess may be substantially half of the radial extension of the locking member.

The output member may be rotationally coupled to a shaft arranged to rotate about the rotational axis, such that the output member can rotate relative to the shaft about the rotational axis. The shaft may be fixedly connected to (directly or indirectly), or integrally formed with, the input member for a common rotation about the rotational axis.

Throughout the present disclosure, an electronic locking system may alternatively be referred to as an electromechanical lock.

The release mechanism may further comprise a stationary structure and a biasing member arranged to provide a counter force against a relative rotation between the input member and the stationary structure. The biasing member may be preloaded. A preload according to the present disclosure may be constituted by a pretension.

Each locking member of the release mechanism may be constituted by a rigid body, such as a metal body, for example a ball or a cylinder.

Throughout the present disclosure, the locking ring may alternatively be referred to as a locking sleeve. Each of the input member and the output member may have a generally circular appearance or may have a section with a generally circular appearance.

As used herein, energy efficiency includes both mechanical efficiency as well as energy conversion efficiency, e.g. conversion of mechanical energy to electric energy.

The release mechanism may further comprise a biasing member arranged to provide a counter force against a relative rotation between the input member and the locking ring. According to one variant, the biasing member is a tension spring. As an alternative variant, the biasing member is a compression spring or a biasing member other than a spring, e.g. attracting or repelling magnets. In case the biasing member is a tension spring, the tension spring may be laid around a part of the outer circumferential profile of the locking ring.

Also the locking ring may be arranged to rotate about the rotational axis. The release mechanism may further comprise a stationary structure accommodating the locking ring and a blocking structure for limiting rotation of the locking ring within the stationary structure. As some non-limiting examples, the blocking structure may limit relative rotation of the locking ring within the stationary structure to 35° to 45°, such as 38° to 42°, such as 40°, from a starting position.

The blocking structure may comprise a locking ring block protrusion on the locking ring. The locking ring block protrusion may be arranged to stop against a stop, e.g. against a protrusion or an end of a slot, of the stationary structure for limiting the relative rotation of the locking ring within the stationary structure.

Alternatively, or in addition, the stationary structure may limit rotation of the output member about the rotational axis when the output member has been released. In this manner, the output member can be stopped in a starting position. For this purpose, the stationary structure may comprise one or more stops for stopping rotation of the output member.

More specifically, the output member may comprise an annular portion on which the output member recess is provided and a cam profile, next to the annular portion along the rotational axis. The annular portion and the cam profile of the output member may be integrally formed, or fixedly attached. The cam profile of the output member may comprise one or more movable stops (movable when the output member rotates) for engaging a corresponding stationary stop of the stationary structure.

The stationary structure may be constituted by a housing or a part of a housing. The housing may have a generally cylindrical appearance.

The release mechanism may further comprise a limiting structure for limiting relative rotation between the input member and the locking ring. The limiting structure may comprise an input member protrusion on the input member received in a groove in the locking ring. Alternatively, or in addition, the limiting structure may allow a relative rotation between the input member and the locking ring of at least 5°. The input member protrusion may extend radially outwardly through the locking ring groove. In this manner, a spring can be attached to the input member protrusion radially outwardly of the locking ring. The locking ring may comprise a protrusion, in addition to, alternatively to or constituted by the locking ring block protrusion, for the spring to be attached to. Both this protrusion and the input member protrusion may for example be constituted by radially outwardly extending pins.

The input member, the output member and the locking ring may be hollow such that a shaft concentric with the rotational axis can pass through the release mechanism. This contributes to a compact design of an electronic locking system comprising the release mechanism.

According to a further aspect, there is provided an assembly for an electronic locking system, wherein the assembly comprises a release mechanism according to the present disclosure. The assembly may comprise a shaft fixedly connected to (directly or indirectly), or integrally formed with, the input member.

In contrast to a solution where a gear is provided to change (e.g. increase) a rotational speed of a input member from a rotational speed of a shaft, the assembly of this aspect provides for a gearless design of the assembly if the shaft is rotationally fixed to the input member. The shaft may be arranged to be actuated by one or two handles. Each handle may be fixedly connected to (directly or indirectly), or integrally formed with, the shaft.

The assembly may further comprise a freewheel mechanism and/or an electric generator according to the present disclosure. In case such assembly comprises one handle, the freewheel mechanism and/or the electric generator may be arranged between the handle and the release mechanism, along the rotational axis. For example, the assembly may comprise, in order along the rotational axis, a handle, an electric generator and/or a freewheel mechanism and a release mechanism, or, a handle, a release mechanism and an electric generator and/or a freewheel mechanism. In each case, the assembly may comprise a further handle on the opposite side of the first handle.

The assembly may further comprise at least one handle fixedly connected to (directly or indirectly), or integrally formed with, the input member.

A handle according to the present disclosure may have any type of form suitable for being actuated by the hand of a user to cause rotation of the input member about the rotational axis. For example, the actuating element may have an elongated appearance (e.g. a traditional door handle) or may be constituted by a knob. The handle may be directly or indirectly connected to the input member. According to one variant, the handle is fixedly attached to each end of a shaft, which in turn is fixed to the input member. Each handle may be arranged to rotate about the rotational axis of the input member.

The assembly may further comprise an electric generator having a rotor. A rotation of the output member may be transmitted to a rotation of the rotor of the electric generator to generate electric energy. The electric energy may be stored in a battery, capacitor or supercapacitor etc. which may or may not be comprised by the assembly. A rotation of the output member may for example be transmitted to the rotor of the electric generator via a freewheel mechanism according to the present disclosure.

According to a further aspect, there is provided a freewheel mechanism comprising a drive member arranged to rotate about a rotational axis, the drive member comprising a radially outer profile provided with teeth; a driven member arranged to rotate about the rotational axis; and at least one pawl movably supported by the driven member for movement between a contact position where the at least one pawl is in contact with the teeth and a non-contact position where the at least one pawl is not in contact with the teeth; wherein the freewheel mechanism is configured such that the at least one pawl adopts the non-contact position due to a centrifugal force acting on the at least one pawl when the driven member rotates at a speed above a rotational speed threshold and when the drive member starts to decelerate; and wherein the freewheel mechanism is configured such that the at least one pawl adopts the contact position when the driven member rotates at a speed below the rotational speed threshold.

In some prior art freewheels, for example ratchet freewheels, the pawl of the driven disc slips over the teeth of the drive disc when the rotational speed of the drive disc is lower than the rotational speed of the driven disc. This causes frictional losses.

By configuring the freewheel mechanism such that the at least one pawl moves to the non-contact position at rotational speeds of the driven member over the rotational speed threshold and when the rotational speed of the drive member starts to decelerate, this type of friction loss can be eliminated since there is no mechanical contact between the at least one pawl and the teeth. In other words, not only is the drive member operatively disengaged from the driven member when the at least one pawl adopts the non-contact position (i.e. the drive member is disabled from driving the driven member), but the at least one pawl is also mechanically disengaged from the teeth of the drive member and does not bounce or slip on the teeth when the at least one pawl adopts the non-contact position.

When the drive member and the driven member are stationary, the at least one pawl will adopt the contact position since the rotational speed of the driven member, which is zero, is below the rotational speed threshold of the driven member.

When the drive member starts to accelerate, a drive face of at least one tooth will contact a driven face of the at least one pawl. As a consequence, the driven member will be driven by the drive member and the drive member and the driven member will be accelerated together.

When the drive member continues to accelerate up to rotational speeds above the rotational speed threshold, the centrifugal force acting on the at least one pawl would, as such, be sufficient to force the at least one pawl from the contact position to the non-contact position. However, as long as the drive member continues to accelerate, there will be a force from the drive face of at least one teeth acting on the driven face of an associated pawl according to Newton's Second Law (the sum of the forces F on an object is equal to the mass m of that object multiplied by the acceleration a of the object).

This accelerating force will keep the at least one pawl from being moved from the contact position to the non-contact position. Therefore, the drive member will continue to drive the driven member as long as it is accelerated, i.e. regardless of whether the rotational speed of the driven member is below or above the rotational speed threshold. Thus, the freewheel mechanism enables the driven member to be accelerated into rotational speeds far beyond the rotational speed threshold.

When the drive member stops accelerating, the drive member and the driven member will rotate at the same speed for a short time. At this time, the static friction between the drive face of the at least one tooth and the driven face of the associated pawl will counteract the movement of the at least one pawl from the contact position to the non-contact position. Depending on the implementation, the centrifugal force acting on the at least one pawl may or may not overcome this static force when the drive member and the driven member rotate at the same rotational speed. However, as soon as the drive member initiates deceleration, the drive face of the tooth will lose contact with the driven face of the pawl and the centrifugal force acting on the pawl will move the pawl from the contact position to the non-contact position.

The drive member may decelerate faster than the driven member. For example, the drive member may have a lower weight than the driven member. As long as the driven member is driven at a rotational speed above the rotational speed threshold, the centrifugal force acting on the at least one pawl will force the at least one pawl to move from the contact position to the non-contact position. The driven member is then allowed to rotate freely without any mechanical contact between the at least one pawl and the teeth of the drive member.

Once the driven member is decelerated to a rotational speed below the rotational speed threshold, the centrifugal force acting on the at least one pawl will be reduced such that the at least one pawl is moved from the non-contact position to the contact position, for example by means of gravity or a biasing member.

When the at least one pawl has adopted the contact position, the at least one pawl will slip on the teeth of the drive member if the rotational speed of the drive member is lower than the rotational speed of the driven member, or will be driven by the teeth of the drive member if the rotational speed of the drive member is higher than the rotational speed of the driven member.

The rotational speed threshold may vary depending on implementation. For example, the rotational speed threshold will be higher if the weight of the at least one pawl is reduced, and vice versa.

A driven member according to the present disclosure may be constituted by, comprise or be connected to (directly or indirectly), a flywheel for storing rotational energy. The driven member may be used to drive a rotor of the electric generator. The driven member may be integrally formed with the rotor or fixedly connected to (directly or indirectly) the rotor. In contrast to a solution where a gear is provided to change (e.g. increase) a rotational speed of a rotor from a rotational speed of a driven member, the freewheel mechanism provides for a gearless design if the rotor is rotationally fixed to the driven member.

It is thus possible to omit a flywheel if the rotor of the electric generator has a sufficient moment of inertia. In this case, the drive member may be arranged to directly engage the rotor. Thereby, the driven member may be constituted by the rotor of the electric generator.

The at least one pawl may be rotationally supported by the driven member for rotation about a pawl axis, substantially parallel with the rotational axis, between the contact position and the non-contact position. The at least one pawl can thereby be rotated about the pawl axis between the contact position and the non-contact position.

In this case, a driven face of the at least one pawl may be arranged at a trailing side with respect to an associated pawl axis. Furthermore, in order to rotationally support the at least one pawl for rotation about the pawl axis, the driven member may comprise a pin engaging a hole in a respective pawl, or vice versa.

The freewheel mechanism may further comprise a biasing member arranged to bias the at least one pawl towards the contact position. The biasing member may for example be constituted by one or more springs or magnets (attracting or repelling).

The at least one pawl may move between the contact position and the non-contact position by rotation, radial movement, combinations thereof or in other ways. One biasing member may be associated with each pawl. Alternatively, one biasing member may be associated with all pawls.

The biasing member may be an annular spring arranged radially between the at least one pawl and the driven member. The biasing member may thus force the at least one pawl towards the contact position by a substantially radially inwardly directed force (with respect to the rotational axis). This variant may or may not be implemented in combination with at least one pawl rotationally supported about a pawl axis.

In case this variant is implemented in combination with at least one pawl rotationally supported about a pawl axis, the at least one pawl may comprise an outer cam profile arranged to be engaged by the annular spring. The contact point between the annular spring an the outer cam profile of the pawl may move along the cam profile depending on the compression state of the annular spring. Thus, the freewheel mechanism may comprise a moving contact point between the biasing member and the at least one pawl. Alternatively, the at least one pawl may comprise a sprag that adds further rotation to the pawl.

As a further alternative, in case the at least one pawl is rotationally supported by the driven member for rotation about a pawl axis, a biasing member in the form of a torsion spring may be associated with each pawl to provide a torque to the at least one pawl such that the pawl is forced towards the contact position.

The teeth may be evenly distributed along the radially outer profile of the drive member and the angular position of a driven face of each pawl with respect to the rotational axis may be defined as:

$$A_n = n*360/P + n*360/(T*n)$$

where $A_n$ is the angular position in degrees, P is the number of pawls, T is the number of teeth and n is an integer from 1 to P.

For this variant, the drive member may comprise at least two pawls. In case the freewheel mechanism comprises five pawls and a drive member with 24 teeth and the pawls are evenly distributed around the rotational axis, the pawls will be positioned at angular positions of 0° (first pawl), 72° (second pawl), 144° (third pawl), 216° (fourth pawl) and 288° (fifth pawl). The 24 evenly distributed teeth will be positioned at angular intervals of 15°. In the worst case, for example when the drive member is positioned such that the teeth are positioned at 13°, 28°, 43°, / . . . /, 328°, 343°, 358°, the drive member will have to rotate 5° until a tooth on the drive member engages a pawl of the driven member (when the 19th tooth has rotated 5° from 283°, it will engage the fifth pawl).

However, if the freewheel mechanism comprises five pawls and a drive member with 24 teeth and the pawls are positioned according to the above formula, the pawls will be positioned at angular positions about the rotational axis of 87° (first pawl), 159° (second pawl), 231° (third pawl), 303° (fourth pawl) and 375°, i.e. 15° (fifth pawl). In the worst case here, for example when the drive member is positioned such that the teeth are positioned at 1°, 16°, 31°, / . . . /, 316°, 331°, 346°, the drive member will have to rotate only 2° until a tooth on the drive member engages a pawl of the driven member (when the 21st tooth has rotated 2° from 301°, it will engage the fifth pawl).

Thus, by distributing the driven faces of pawls (and also the pawls if the pawls have the same size) around the rotational axis according to the above formula, the play between the drive member and the driven member can be reduced. Thereby, the efficiency of the freewheel mechanism is improved since the drive member can be brought into engagement with the driven member faster. In addition, a tooth of the drive member will hit a pawl of the driven member with a lower force.

If the drive member is driven by (or constituted by) an output member of a release mechanism according to the present disclosure, by "collecting" the energy from the rotation of the drive member as early as possible, the energy efficiency of the freewheel mechanism can be increased and losses prior to engagement between the teeth and the pawls can be reduced.

For some configurations where the driven faces of the pawls are distributed in this way, not all of the pawls may be driven. For example, only one of the pawls may be driven by a tooth of the driven member. In the above specific example, only the fifth pawl will be driven. However, for many implementations, in particular an implementation in an electronic locking system, a fast engagement of one of the pawls is more important than a simultaneous engagement of all the pawls, e.g. to transmit a higher torque.

For example, if the freewheel mechanism is used with a release mechanism according to the present disclosure, a fast engagement is valuable in terms of energy harvesting since the rotational speed of the output member and the drive member, and consequentially also the rotational energy of the output member and the drive member, is highest immediately after the release.

The drive member and the driven member may be hollow such that a shaft concentric with the rotational axis can pass through the freewheel mechanism. This enables a compact design of the freewheel mechanism within a stationary structure (e.g. a housing) of an assembly. In addition, this configuration enables the driven member to be positioned at a radially outmost region within the stationary structure. By increasing the radial distance to the driven member, the velocity of a point on the periphery of the driven member will be increased for any given rotational speed.

The driven member may at least partly enclose the drive member along the rotational axis. According to one variant, the drive member is fully enclosed by the driven member along the rotational axis.

According to a further aspect, there is provided an assembly for an electronic locking system, wherein the assembly comprises a freewheel mechanism according to the present disclosure. Thus, a freewheel mechanism according to the present disclosure may be suitable for use in an electronic locking system. However, the freewheel mechanism according to the present disclosure may also be used in many other technical fields, for example within the field of bicycles.

The assembly may further comprise an electric generator having a rotor, wherein the driven member is fixedly connected to (directly or indirectly), or integrally formed with, the rotor.

According to a further aspect, there is provided an assembly for an electronic locking system, wherein the assembly comprises a release mechanism according to the present disclosure and a freewheel mechanism according to the present disclosure, wherein the output member is fixedly connected to (directly or indirectly), or integrally formed with, the drive member. This contributes to a gearless design of the assembly and further reduces losses.

According to a further aspect, there is provided an assembly for an electronic locking system, the assembly comprising a shaft arranged to rotate about a rotational axis from a starting position; a spring arranged to store mechanical energy from rotational displacement of the shaft from the starting position; and a release mechanism arranged to release the mechanical energy stored in the spring to an output member; wherein spring is preloaded when the shaft is in the starting position.

By preloading the spring, more mechanical energy can be stored in the spring for a certain deformation, i.e. the energy efficiency can be improved. Conversely, the deformation of the spring can be reduced in order to store a certain amount of energy, i.e. the space required by the assembly can be reduced and the design of the assembly can be made more compact. The preloading of the spring may also contribute to an improved user experience. The user can for example feel the loading of the spring and the release of the spring when actuating the shaft, e.g. by means of a handle. According to one example, the spring is preloaded with a torque of 1 to 1.5 Nm.

The spring may be preloaded between the output member and a stationary structure, for example a stationary structure comprised by the assembly. The preload may be set when installing the spring.

The release mechanism according to this aspect may or may not be constituted by a release mechanism according to the remainder of the present disclosure.

According to a further aspect, there is provided an assembly for an electronic locking system, the assembly comprising a shaft arranged to rotate about a rotational axis from a starting position; a spring arranged to store mechanical energy from rotational displacement of the shaft from the starting position; and a release mechanism arranged to release the mechanical energy stored in the spring to an output member; wherein spring is a torsion spring encircling the shaft.

By arranging the spring to encircle the shaft, "dead" volume within the spring, i.e. a volume that does not contain any functional components, can be used to accommodate the shaft. This contributes to a more compact design of the assembly.

The release mechanism according to this aspect may or may not be constituted by a release mechanism according to the remainder of the present disclosure.

The spring may be preloaded when the shaft is in the starting position. According to one variant, the spring is a helical torsion spring.

According to a further aspect, there is provided an assembly for an electronic locking system, the assembly comprising a stationary structure; a shaft arranged to rotate within the stationary structure about a rotational axis; and a release mechanism arranged to release a spring force induced by rotation of the shaft to an output member; wherein the shaft extends through the stationary structure along the rotational axis such that a handle can be fixed to the shaft at each side of the stationary structure.

In this manner, an output member of a release mechanism can be released, e.g. to drive a rotor of an electric generator, independently by a handle on each side of the stationary structure, e.g. either by a handle on the inside of a door and a handle on the outside of the door. Thereby, the mechanical energy generated by actuating the handle on the inside of the door when exiting through the door can also be collected and converted to electric energy.

The release mechanism according to this aspect may or may not be constituted by a release mechanism according to the remainder of the present disclosure. Furthermore, the assembly according to this aspect may be combined with any assembly of the previous aspects, i.e. wherein the spring is preloaded when the shaft is in the starting position and/or wherein the spring is a torsion spring encircling the shaft.

The stationary structure may have a generally cylindrical appearance and/or may be constituted by a housing. As some non-limiting examples, the total length of the stationary structure along the rotational axis may be 35 mm to 55 mm, such as 41 mm to 43 mm.

According to a further aspect, there is provided an assembly for an electronic locking system, the assembly comprising a shaft arranged to rotate about a rotational axis; a freewheel mechanism; and an electric generator; wherein the freewheel mechanism and the electric generator are hollow and the shaft passes therethrough along the rotational axis.

The hollow freewheel mechanism and hollow electric generator enable a design where the outer peripheries of the freewheel mechanism and the electric generator are positioned further outwards in the radial direction, e.g. close to an inner wall of a stationary structure, such as a housing.

This enables the velocity of points on these peripheries to be increased for any given rotational speed. For example, the peripheral speed of a driven member (e.g. a flywheel) of the freewheel mechanism or of a rotor of the electric generator can be increased in comparison with prior art devices that do not have an opening for a shaft.

In addition, since the hollow freewheel mechanism and the hollow electric generator do not occupy a central portion, the assembly and an electronic locking system comprising the assembly can be made more compact.

The freewheel mechanism according to this aspect may or may not be constituted by a freewheel mechanism according to the remainder of the present disclosure. Furthermore, the electric generator according to this aspect may or may not be constituted by an electric generator according to the remainder of the present disclosure.

The shaft according to this aspect may also extend through the stationary structure along the rotational axis such that a handle can be fixed to the shaft at each side of the stationary structure.

The assembly may further comprise a torsion spring arranged to store mechanical energy from rotational displacement of the shaft from a starting position; wherein the spring encircles the shaft and passes through the electric generator and optionally through or into the freewheel mechanism.

In addition to contributing to a more compact design, by arranging the spring to extend through the electric generator, the spring can be made longer to enable a higher preload. The spring can be made even longer (and an even higher preload can be enabled) if also extended through or into the freewheel mechanism. A higher preload of the spring contributes to an improved energy efficiency of the assembly.

The spring may be coaxial with the shaft. Furthermore, the spring may be constituted by a helical torsion spring. Also in this aspect, the spring may be preloaded when the shaft is in the starting position.

According to a further aspect, there is provided an electronic locking system comprising a release mechanism, a freewheel mechanism and/or any assembly according to the present disclosure. The electronic locking system may further comprise an electric generator. The electronic locking system may further comprise an electronic access control device powerable by the electric generator.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
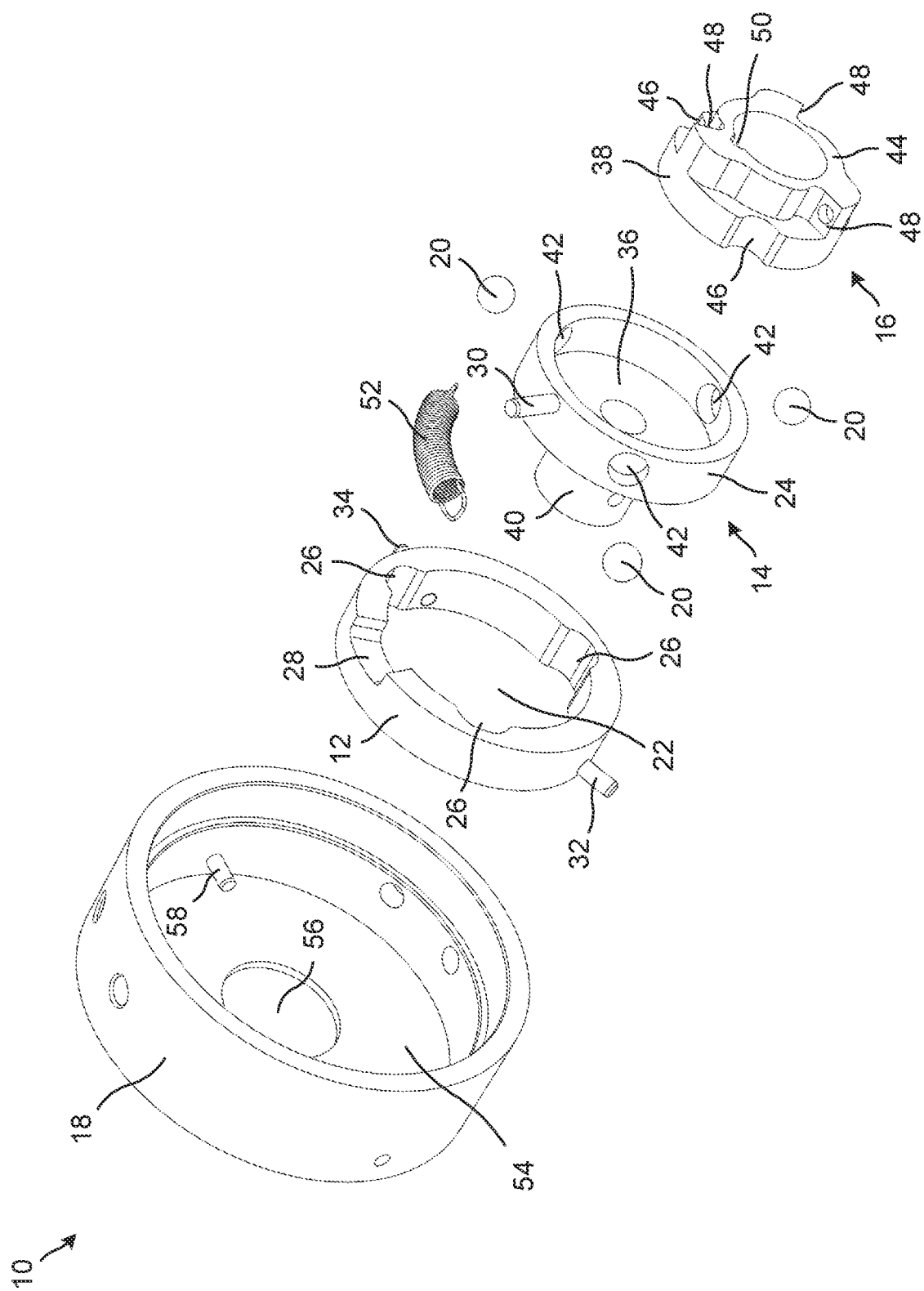
FIG. 1 schematically represents an exploded perspective view of a release mechanism.

FIG. 1 schematically represents an exploded perspective view of a release mechanism 10. The release mechanism 10 comprises a locking ring 12, an input member 14 and an output member 16. The release mechanism 10 of this example further comprises a stationary structure 18. The stationary structure 18 constitutes a housing or casing for components of the release mechanism 10. However, the stationary structure 18 may be omitted from the release mechanism 10 and may for example be constituted by a stationary part of an electric generator.

The release mechanism 10 further comprises a plurality of locking members 20. In this example, the release mechanism 10 comprises three locking members 20 but the release mechanism 10 may comprise one, two or more than three locking members 20.

The locking ring 12 is generally circular and comprises a locking ring opening 22. The locking ring opening 22 is configured to accommodate the input member 14. The inner diameter of the locking ring opening 22 is slightly larger than the outer diameter of an annular portion 24 of the input member 14.

The locking ring 12 further comprises three locking ring recesses 26. The locking ring recesses 26 are evenly distributed around the inner surface of the locking ring 12, i.e. angularly spaced 120°. Each locking ring recess 26 constitutes a seat for one locking member 20. In this example, each locking ring recess 26 extends axially through the width of the locking ring 12. However, the locking ring recesses 26 may alternatively be constituted by dimples with a diameter less than the width of the locking ring 12.

The locking ring 12 further comprises a locking ring groove 28 for receiving a protrusion of the input member 14. The input member protrusion 30 is here implemented as a radially outwardly extending pin. The locking ring groove 28 and the input member protrusion 30 jointly constitute one example of a limiting structure according to the present disclosure.

The locking ring groove 28 may have an angular extension of at least 5°, in this example approximately 6°. Furthermore, the locking ring groove 28 of this example is axially opened at one face of the locking ring 12 and extends radially through the entire thickness of the locking ring 12. As used herein, a width direction is a direction parallel to a rotational axis (described below) and a thickness direction is direction perpendicular to the rotational axis, i.e. a radial direction.

The locking ring 12 further comprises two protrusions 32, 34, here implemented as radially outwardly protruding pins. In this example, the protrusion 32 is used to block rotation of the locking ring 12 and the protrusion 34 is used as a spring attachment.

The annular portion 24 of the input member 14 defines an input member opening 36. The input member opening 36 is configured to accommodate a circular portion 38 of the output member 16. The inner diameter of the input member opening 36 is slightly larger than the outer diameter of the circular portion 38 of the output member 16.

In addition to the annular portion 24, the input member 14 of this example further comprises a hollow annular projection 40 to which a handle (not shown) may be attached. A shaft (not shown) can be received in the hollow annular projection 40. The annular portion 24 of the input member 14 comprises three input member recesses 42. The input member recesses 42 are implemented as through holes extending radially through the thickness of the annular portion 24. The input member recesses 42 are angularly spaced such that each input member recess 42 can be aligned with a locking ring recess 26 when the input member 14 is accommodated in the locking ring opening 22.

The output member 16 of this example is generally composed of two sections, the circular portion 38 and a cam profile 44, next to the circular portion 38 in the width direction of the output member 16. The circular portion 38 comprises three output member recesses 46 (only two are shown in FIG. 1). The output member recesses 46 are angularly distributed such that each output member recess 46 can be aligned with an input member recess 42.

In this example, each output member recess 46 extends axially through the width of the output member 16. However, the output member recesses 46 may alternatively be constituted by dimples with a diameter less than the width of the output member 16.

The cam profile 44 of the output member 16 comprises three movable stops 48. The stops 48 are named "movable" since the output member 16 is movable with respect to a stationary structure. The movable stops 48 are designed to stop against stationary stops (not shown) of a stationary structure, for example of the stationary structure 18.

The output member 16 further comprises a groove 5o for partly receiving a locking pin (not shown) in order to lock the output member 16 to a sleeve (not shown). The groove extends axially through the width of the output member 16.

The locking members 20 may be constituted by rigid spherical bodies and are here exemplified as steel balls. However, the locking members 20 may be of different material and/or shape, e.g. cylindrical. The release mechanism 10 is configured such that the diameter of each locking member 20 substantially corresponds to, i.e. is slightly less than, the sum of the radial extension of a locking ring recess 26 and the radial extension of a input member recess 42 and to the sum of the radial extension of an input member recess 42 and the radial extension of an output member recess 46.

The release mechanism 10 in FIG. 1 further comprises a biasing member 52. The biasing member 52 is configured to provide a counter force against a relative rotation between the input member 14 and the locking ring 12. In this example, the biasing member 52 is constituted by a helical tension spring. The ends of the biasing member 52 will be attached to the locking ring protrusion 34 and the input member protrusion 30. The biasing member 52 can be bent to conform to the outer profile of the locking ring 12.

The stationary structure 18 comprises a side wall 54 comprising a centrally disposed opening 56 for receiving the hollow annular projection 40 of the input member 14 therethrough. The stationary structure 18 further comprises a protrusion 58, here constituted by a radially inwardly protruding pin in order to provide a stop for the locking ring block protrusion 32.

FIGS. 2a-2d schematically represent front views of a release mechanism 10 in different states. The implementation of the release mechanism 10 in FIGS. 2a-2d differs from the implementation in FIG. 1 with the main difference that the release mechanism 10 in FIGS. 2a-2d comprises only one locking member 20, one output member recess 46, one input member recess 42 and one locking ring recess 26. In FIGS. 2a-2d, each of the input member 14, output member 16 and the locking ring 12 is rotatably arranged about a rotational axis 60.

Figure 2A:
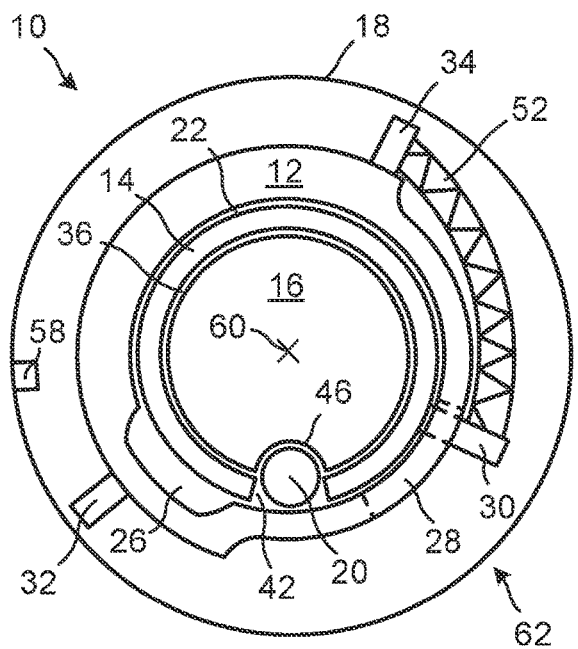
FIGS. 2a, 2b, 2c and 2d schematically represent front views of a release mechanism in different states.

FIG. 2a shows the release mechanism 10 in a starting position, e.g. if a handle (not shown) fixedly connected to the input member 14 is not actuated. The locking member is accommodated in the output member recess 46 and in the input member recess 42. The locking member 20 is here exemplified as being in a vertically lowermost position.

As shown in FIG. 2a, the input member protrusion 30 protrudes through the locking ring groove 28. The input member protrusion 30 and the locking ring groove 28 constitute one example of a limiting structure 62. Due to the tension force from the biasing member 52, the locking ring 12 is pulled in the clockwise direction until the locking ring 12 is stopped by abutment of the input member protrusion 30 against the end of the locking ring groove 28.

In the starting position of FIG. 2a, the output member 16 may be biased in the counter clockwise direction by means of a spring (not shown). Alternatively, the output member 16 may not be biased in the starting position.

Figure 2B:
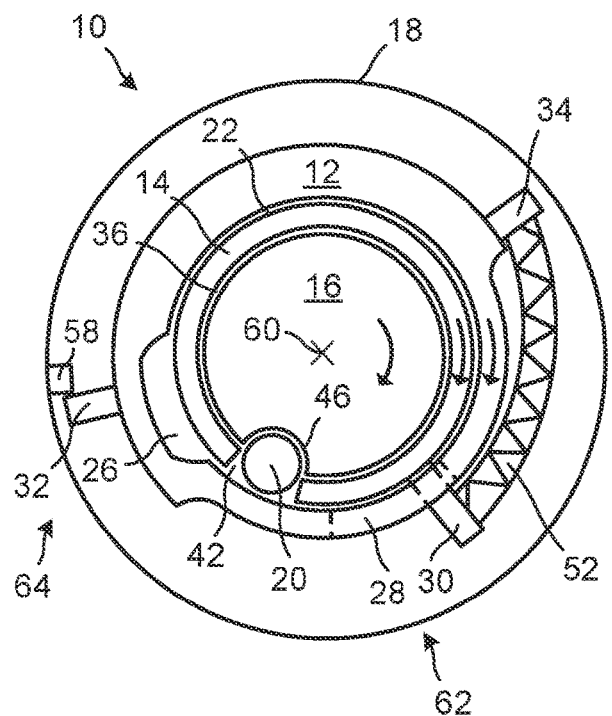

In FIG. 2b, the input member 14 has been rotated 40° in the clockwise direction, for example by actuating a handle. Since the locking member 20 is accommodated both in the input member recess 42 and in the output member recess 46 and is prevented to move from this position by the locking ring 12, the output member 16 rotates together with the input member 14 in the clockwise direction. At the same time, the spring (not shown) stores the energy of the rotation of the input member 14.

Furthermore, the biasing member 52 is configured such that also the locking ring 12 can rotate together with the input member 14. That is, the biasing member 52 is sufficiently stiff such that it does not expand when rotating the input member 14 from the starting position in FIG. 2a to the 40° position in FIG. 2b. During this movement, the input member protrusion 30 stays in contact with the end of the locking ring groove 28. The locking ring 12 may be pulled in this manner by a biasing member 52 other than a spring, e.g. for example by attracting magnets on the input member protrusion 30 and on the end of the locking ring groove 28.

As shown in FIG. 2b, the locking ring 12 has been rotated clockwise to a position where the locking ring block protrusion 32 is brought into contact with the protrusion 58 of the stationary structure 18. Thereby, the locking ring 12 is prevented from rotating further in the clockwise direction. The locking ring block protrusion 32 and the protrusion 58 of the stationary structure 18 constitute one example of a blocking structure 64 according to the present disclosure.

Figure 2C:
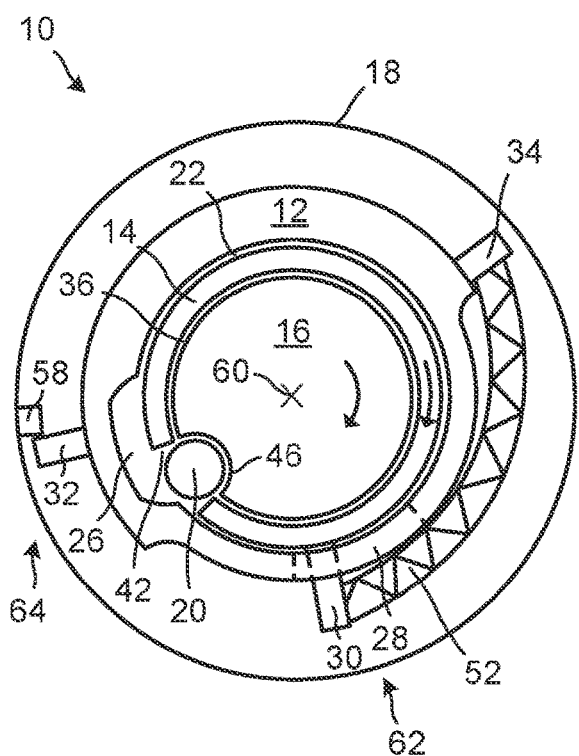

FIG. 2c shows a state of the release mechanism 10 where the input member 14 has been rotated further in the clockwise direction from FIG. 2b. In FIG. 2c, the input member 14 has been rotated 44° from the starting position.

In FIG. 2C, the locking ring 12 is still stopped at a rotation of 40°, as shown in FIG. 2b. Due to the further rotation of the input member 14 in FIG. 2c, the output member 16 has rotated together with the input member 14 to a position where the input member recess 42 starts to become aligned with the locking ring recess 26. At the same time, the input member protrusion 30 travels through the locking ring groove 28 and tensions the biasing member 52.

Figure 2D:
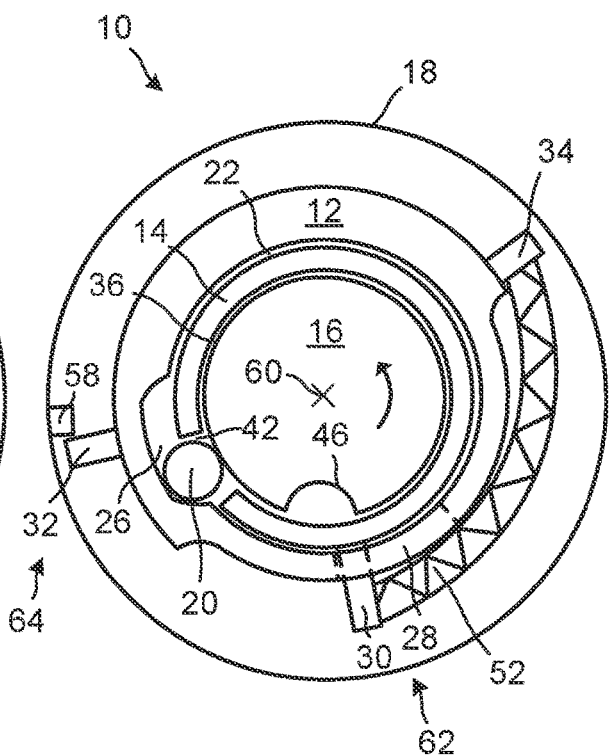

FIG. 2d shows a state of the release mechanism 10 where the input member 14 has been rotated slightly further in the clockwise direction from FIG. 2C. In FIG. 2d, the input member 14 has been rotated 45° from the starting position in FIG. 2a.

In FIG. 2d, the input member recess 42 is fully aligned with the locking ring recess 26 such that the locking member 20 is pushed out (or falls out) from the output member recess 46. As shown in FIG. 2d, the locking member 20 is thereby accommodated in the input member recess 42 and in the locking ring recess 26.

Since the locking member 20 has now moved out from the output member recess 46, the output member 16 is released to rotate in the counter clockwise direction back to the starting position. This rotation is generated by releasing the energy stored in the spring (not shown) due to the rotation of the output member 16 from the starting position.

Once the force on the input member 14 is released, e.g. by releasing an actuating force on a handle fixedly connected to the input member 14, the input member 14 will start to move back to the starting position, for example due to the force of a spring acting on the handle. Since the locking member 20 is positioned in the locking ring recess 26 and the input member recess 42, the locking ring 12 rotates back together with the input member 14 in the counter clockwise direction.

The rotation of the input member 14 and the locking ring 12 in the counter clockwise direction continues until both the input member recess 42 and the locking ring recess 26 are aligned with the output member recess 46. At this position, the force from the biasing member 52 will pull the locking ring 12 in the clockwise direction. This force together with a slanted surface on the locking ring recess 26 will push the locking member 20 radially inwardly until the locking member 20 is accommodated in the output member recess 46 and in the input member recess 42. Then, the pulling force from the biasing member 52 will continue to rotate the locking ring 12 while the input member protrusion 30 travels within the locking ring groove 28 from one end to the other until the locking ring 12 adopts the starting position in FIG. 2a and the entire releasing process can be started again.

Figure 3A:
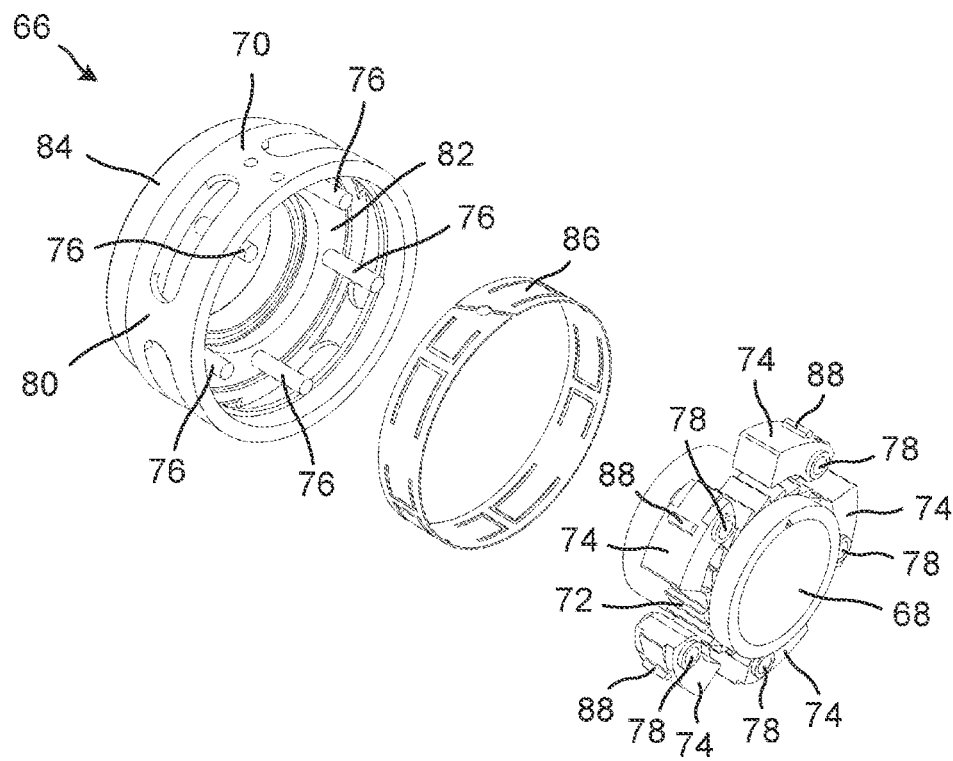
FIG. 3a schematically represents an exploded perspective view of a freewheel mechanism.
Figure 3B:
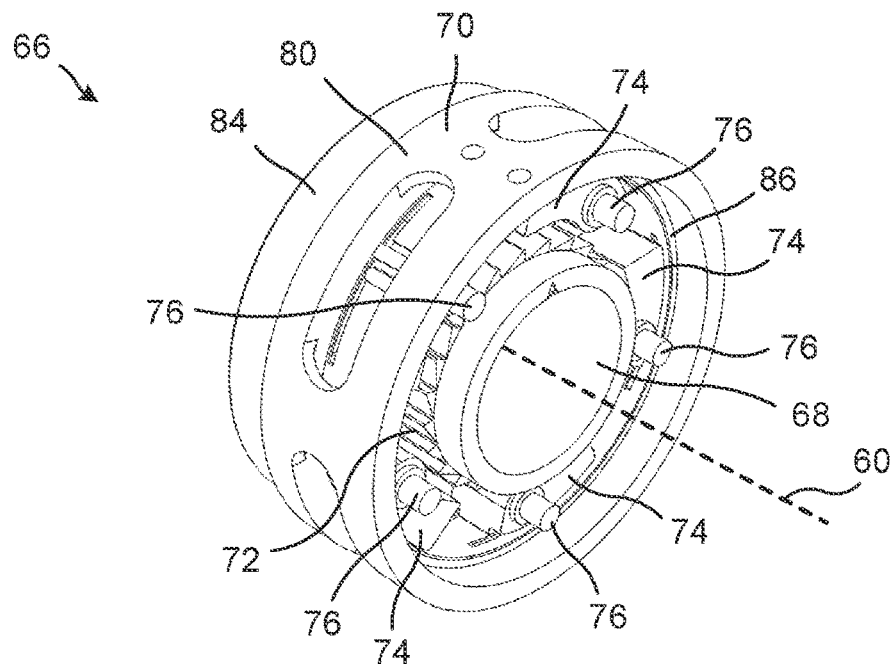
FIG. 3b schematically represents a perspective view of the freewheel mechanism in an assembled state.
Figure 3C:
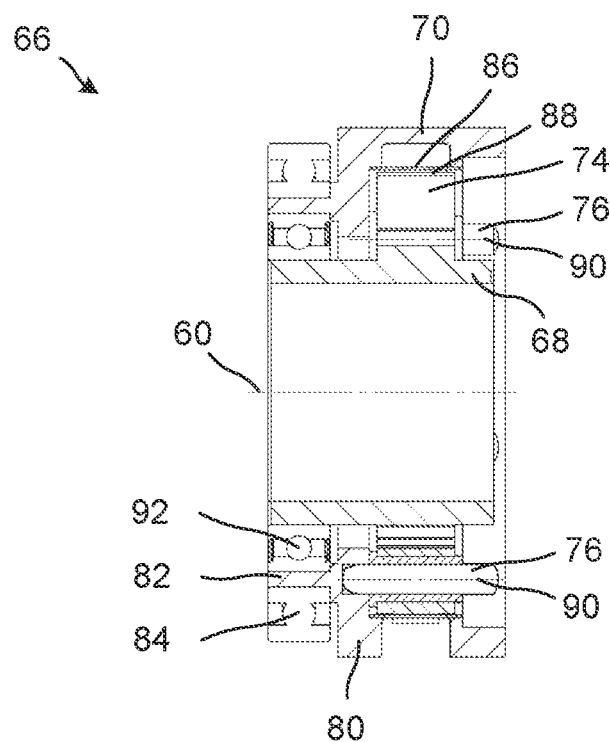
FIG. 3c schematically represents a cross sectional side view of the freewheel mechanism.
Figure 3D:
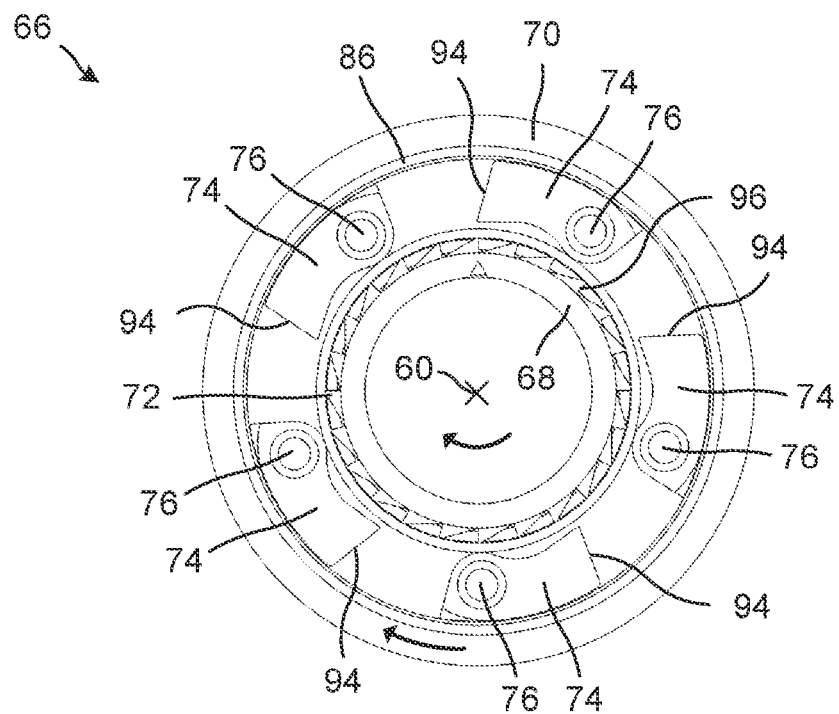
FIG. 3d schematically represents a front view of the freewheel mechanism.

FIG. 3a-3d schematically represents views of a freewheel mechanism 66. FIG. 3a schematically represents an exploded perspective view, FIG. 3b schematically represents an assembled perspective view, FIG. 3c schematically represents an assembled cross sectional side view and FIG. 3d schematically represents an assembled front view.

FIG. 3a shows that the freewheel mechanism 66 comprises a drive member 68 and a driven member 70. The drive member 68 and the driven member 70 are here implemented as wheels. The drive member 68 may be fixedly connected to (directly or indirectly), or integrally formed with the output member 16 in FIGS. 1 and 2a-2d. The driven member 70 may be fixedly connected to (directly or indirectly, e.g. via a flywheel), or integrally formed with a rotor of an electric generator (not shown). The drive member 68 comprises a radially outer profile provided with a plurality of teeth 72.

The freewheel mechanism 66 further comprises at least one pawl 74. In FIG. 3a, the freewheel mechanism 66 comprises five pawls 74 but the number of pawls 74 may be increased or reduced depending on implementation. The driven member 70 comprises five mounting pins 76 for mating with a pivot mount 78 in each pawl 74. In this example, the driven member 70 comprises a circular portion 80 having a base portion 82 to which the mounting pins 76 are attached. FIG. 3a also shows that a bearing 84 is attached to the driven member 70.

The freewheel mechanism 66 further comprises a biasing member 86. In this example, the biasing member 86 is implemented as an annular spring for pushing the pawls 74 radially inwards against the drive member 68. Each pawl 74 comprises a sprag 88 to be contacted by the annular spring 86. The sprag 88 adds further rotation to the pawl 74 about the pivot mount 78 when contacted by the annular spring 86.

An annular spring is merely one of several examples of a suitable biasing member 86 for the freewheel mechanism 66. Other examples include a torsion spring for each pawl 74 or magnets.

The assembled perspective view of FIG. 3b shows that the drive member 68 and the driven member 70 are arranged to rotate about the rotational axis 60. The rotational axis 60 in FIGS. 3b-3d is the same rotational axis as the rotational axis 60 in FIGS. 1-2d. The drive member 68 may be rotationally supported by any type of bearing.

FIG. 3b further shows that the mounting pins 76 extend parallel to the rotational axis 60. In the assembled stated, the pawls 74 are aligned with the teeth 72 along the rotational axis 60.

In the cross sectional side view of the freewheel mechanism 66 in FIG. 3c, it can further be seen that each pawl 74 is arranged to rotate about a pawl axis 90 parallel with the rotational axis 60. FIG. 3c also shows that the freewheel mechanism 66 comprises a bearing 92 for rotationally supporting the drive member 68 within the driven member 70.

FIG. 3d shows a side view of the assembled freewheel mechanism 66 where the drive member 68 and the driven member 70 rotate (clockwise in FIG. 3d) at a speed above a rotational speed threshold. The centrifugal force from the rotation of the driven member acts on each pawl 74. As a consequence, each pawl 74 is forced to rotate (clockwise in FIG. 3d) about an associated mounting pin 76 such that a driven face 94 on each pawl 74 is lifted away from the teeth 72 of the drive member 68 and the biasing member 86 is expanded. In this state, there is no contact at all between the pawls 74 and the teeth 72. This state of the pawls 74 therefore constitutes a non-contact position.

If the drive member 68 decelerates below the rotational speed threshold and the driven member 70 continues to rotate at a speed above the rotational speed threshold (for example because the driven member 70 has a higher mass than the drive member 68), the pawls 74 will remain in the non-contact position and no slipping of the pawls 74 over the teeth 72 will occur. As a consequence, frictional losses of this type can be eliminated.

When the driven member 70 decelerates to a rotational speed below the rotational speed threshold, the radially outwardly directed centrifugal force acting on the pawls 74 will decrease. When the radially inwardly directed force from the biasing member 86 acting on the pawls 74 becomes larger than the radially outwardly directed centrifugal force, the pawls 74 will move from the non-contact position illustrated in FIG. 3d to a contact position. In this example, the radially inwardly directed force provided by the biasing member 86 in the form of an annular spring will push each pawl 74 to rotate in the counter clockwise direction about an associated mounting pin 76 until the pawls 74 meet the teeth 72.

When the pawls 74 have adopted the contact position, drive faces 96 of the teeth 72 will contact the driven faces 94 of the pawls 74 such that the drive member 68 drives the driven member 70 if the rotational speed of the drive member 68 is higher than the rotational speed of the driven member 70 when the pawls 74 enter the contact position. Should the rotational speed of the drive member 68 be below the rotational speed of the driven member 70 when the pawls 74 adopts the contact position, the pawls 74 will slip over the teeth 72.

In the freewheel mechanism 66 of FIGS. 3a-3d, the teeth 72 are evenly distributed along the radially outer profile of the drive member 68 and the angular position (A) of the driven face 94 of each pawl 74 with respect to the rotational axis 60 is defined as:

$$A_n = n*360/P + n*360/(T*n)$$

where $A_n$ is the angular position in degrees, P is the number of pawls 74, T is the number of teeth 72 and n is an integer from 1 to P.

Since the freewheel mechanism 66 comprises 24 teeth 72 and five pawls 74, the pawls 74 are positioned at angular positions about the rotational axis 60 of 87° (first pawl 74), 159° (second pawl 74), 231° (third pawl 74), 303° (fourth pawl 74) and 375°, i.e. 15° (fifth pawl 74). As described above, the drive member 68 will thereby only have to rotate maximum 2° until a drive face 96 of a tooth 72 on the drive member 68 engages a driven face 94 of a pawl 74.

As an example, if the drive member 68 of the freewheel mechanism 66 is arranged to be driven by the output member 16 of the release mechanism 10 in FIGS. 1-2d, the output member 16 and the drive member 68 will accelerate fast when the output member 16 is released. When the drive member 68 and the driven member 70 are stationary and the drive member 68 starts to accelerate due to the release of the output member 16, the drive member 68 will rapidly engage the driven member 70. That is, at least one tooth 72 will engage a pawl 74 (which is in the contact position when the driven member 70 is stationary, i.e. below the rotational speed threshold) within a rotation of 2° of the drive member 68. Thereby, losses due to a rotation of the drive member 68 prior to engaging the driven member 70 can be reduced.

The driven member 70 can be rotated up to any speed while at least one of the pawls 74 is engaged with the teeth 72. Any pawl 74 having a driven face 94 that is not in contact with a drive face 96 of a tooth 72 will move to the non-contact position as soon as the driven member 70 reaches a rotational speed above the rotational speed threshold. However, each pawl 74 having a driven face 94 in driving contact with a drive face 96 of a tooth 72 will continue to be in contact as long as the drive member 68 accelerates. As soon as the drive member 68 starts to decelerate, also this contact will be released such that all pawls 74 adopt the non-contact position. The driven member 70 may then continue to rotate (e.g. to drive a rotor of an electric generator) with reduced losses since the pawls 74 do not slip over the teeth 72.

Figure 4:
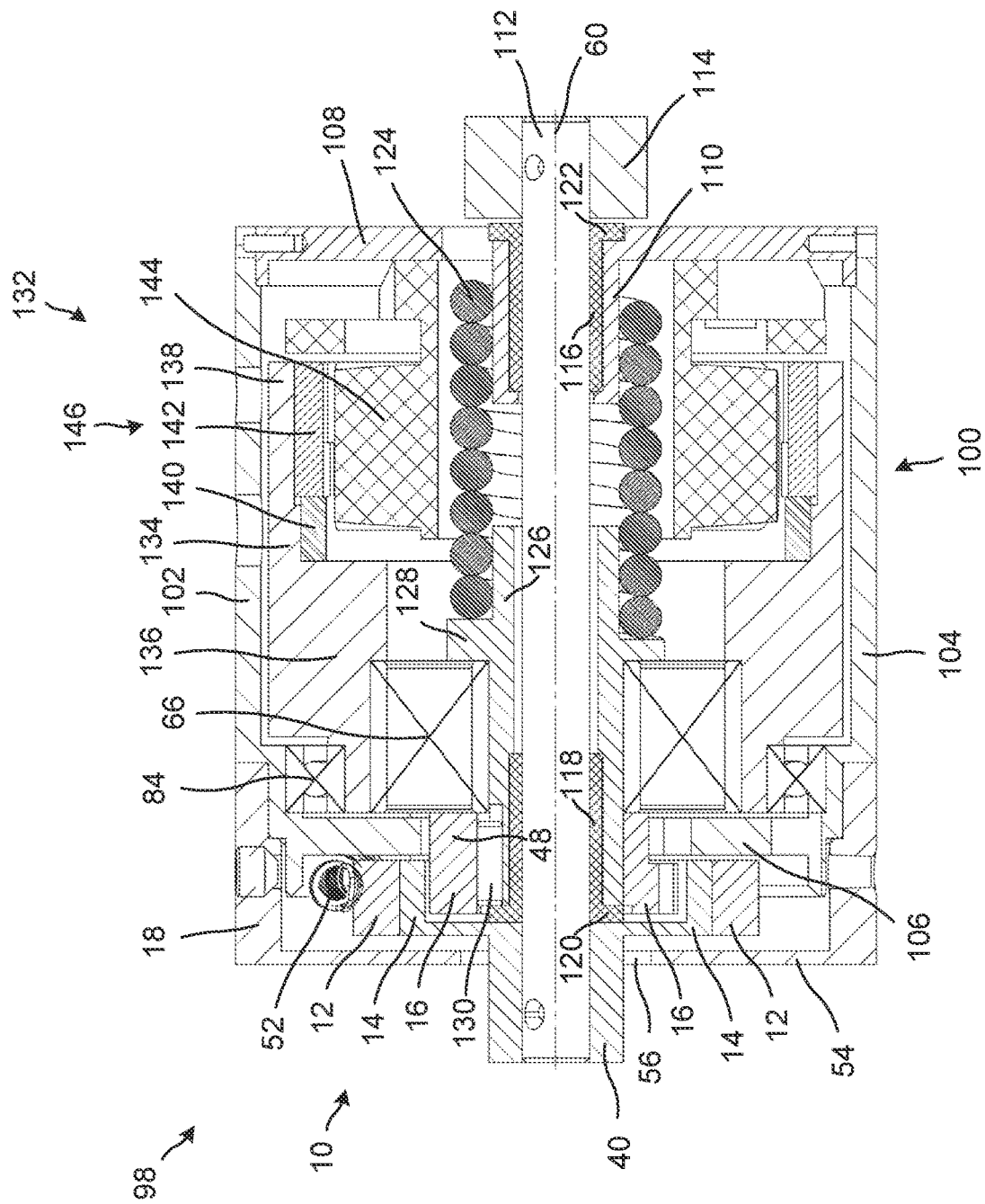
FIG. 4 schematically represents a cross sectional side view of an assembly for an electronic locking system.

FIG. 4 schematically represents a cross sectional side view of an assembly 98 for an electronic locking system. The assembly 98 may be constituted by a cylinder or plug. The assembly 98 comprises a stationary structure generally designated 100. The stationary structure 100 of this example constitutes a casing or housing and comprises the stationary structure 18 (described in connection with the release mechanism 10 in FIGS. 1-2d) and a further stationary structure 102 having a main cylindrical body 104, a transverse wall 106 and a side plate 108 closing the end of the main cylindrical body 104. The side plate 108 comprises a hollow annular projection 110 projecting into the interior of the stationary structure 100.

The assembly 98 further comprises a shaft 112 arranged to rotate about the rotational axis 60, e.g. by actuating a handle (not shown). The shaft 112 extends through the entire stationary structure 100 along the rotational axis 60.

The input member 14 is fixedly connected to the shaft 112. More specifically, the hollow annular projection 40 of the input member 14 is fixed to one end of the shaft 112. The hollow annular projection 40 and the end of the shaft 112 extend to the outside of the stationary structure 100, e.g. for attachment of a handle (not shown). At the opposite end of the shaft 112, a fitment 114 is provided for securing a further handle (not shown) to the shaft 112.

The shaft 112 is rotationally supported by a bearing 116, here implemented as a flanged bearing bushing, received in the hollow annular projection no and a bearing 118, here implemented as a flanged bearing bushing having a flange 120. The flanged bearing bushing 116 comprises a flange 122 to fit in a seat in the side plate 108. The bearing 118 also supports relative rotation between the shaft 112 and the output member 16.

The assembly 98 further comprises a spring 124 arranged to store mechanical energy from rotational displacement of the shaft 112 about the rotational axis 60. In this example, the spring 124 is a helical torsion spring arranged to encircle the shaft 112 and concentric with the shaft 112. The spring 124 is connected to the hollow annular projection 110 of the stationary structure 100 and to a sleeve 126, more specifically to a flange 128 of the sleeve 126.

The sleeve 126 is fixed to the output member 16 for a common rotation about the rotational axis 60. The sleeve 126 is rotationally locked relative to the output member 16 by a locking pin 130. The sleeve 126 may however be integrally formed with the output member 16 or the spring 124 may be directly attached to the output member 16.

In FIG. 4, the assembly 98 is illustrated in a starting position. In this starting position, the spring 124 is preloaded. Thereby, the spring 124 exerts a torque on the output member 16 (via the sleeve 126). However, as shown in FIG. 2a, the output member 16 is locked against rotation in the starting position.

The assembly 98 comprises the release mechanism 10, the freewheel mechanism 66 and an electric generator 132 accommodated within the stationary structure 100. The release mechanism 10 of this example comprises three locking members (not shown).

A flywheel 134 is fixed to the driven member (not shown) of the freewheel mechanism 66. The flywheel 134 comprises a main body 136 and a rotor magnet support 138, here integrally formed with the main body 136. The flywheel 134 is rotationally supported relative to the stationary structure 100 by means of the bearing 84 which is seated against a section interconnecting the main cylindrical body 104 and the transverse wall 106.

The electric generator 132 comprises a magnet support 140 fixed in a seat of the main body 136 of the flywheel 134, magnets 142 provided on the magnet support 140 and on the rotor magnet support 138, and a stator 144. The magnet support 140, the magnets 142 and the rotor magnet support 138 form a rotor 146 of the generator 132. As can be seen in FIG. 4, the radially outer periphery of the main body 136 and the rotor magnet support 138 are positioned close to the radially outer side of the stationary structure 100. Thus, high velocities of the outer points of the flywheel 134 are enabled. The same applies for the rotor 146.

The magnet support 140 may alternatively be connected directly to the main body 136 of the flywheel 134 and take the position of the rotor magnet support 138. In this manner, the rotor 146 can be brought even further radially outwards.

As can be seen in FIG. 4, both the freewheel mechanism 66 and the electric generator 132 are hollow such that the shaft 112 can pass therethrough. This contributes to a more compact design. In addition, the spring 124 passes through the electric generator 132 which allows a higher preload in the spring 124. Although not illustrated in FIG. 4, the spring 124 may also extend into or through the freewheel mechanism 66 to enable an even higher preload.

When the shaft 112 is rotated from the starting position in FIG. 4, for example by actuating a handle (not shown) on any of the sides of the stationary structure 100, the input member 14 rotates and energy is stored in the spring 124 until the release mechanism 10 releases the output member 16 as previously described. The energy stored in the spring 124 will thereby be released to rotate the output member 16 which in turn drives the drive member (not shown) of the freewheel mechanism 66 as previously described. The driven member (not shown) of the freewheel mechanism 66 will drive the flywheel 134 and consequently also the rotor 146 of the electric generator 132 to generate electric energy.

Figure 5:
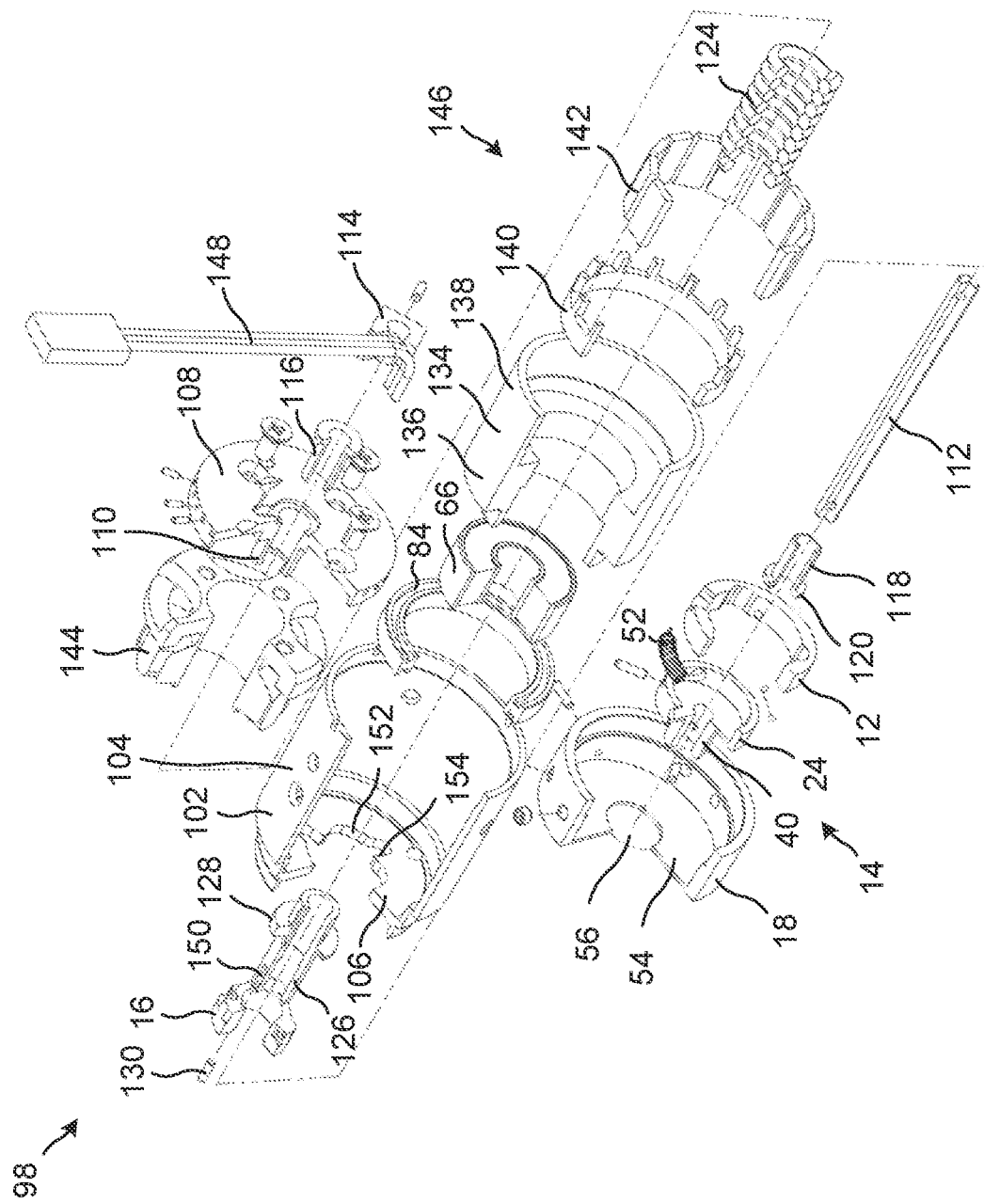
FIG. 5 schematically represents an exploded perspective view of the assembly.

FIG. 5 schematically represents an exploded perspective view of the assembly 98 in FIG. 4 and electrical wiring 148 for the stator 144. Further details of the assembly 98 can here be gathered. For example, FIG. 5 shows that the sleeve 126 comprises a groove 150. The locking pin 130 is seated in the groove 150 of the sleeve 126 and in the axial groove 50 of the output member 16 (see FIG. 1) in order to rotationally lock the sleeve 126 and the output member 16.

FIG. 5 further shows that the transverse wall 106 of the stationary structure 102 comprises a cam profile 152 with stationary stops 154. The movable stops 48 of the output member 16 will contact the stationary stops 154 to stop the output member 16 at the starting position after being released.

Figure 6:
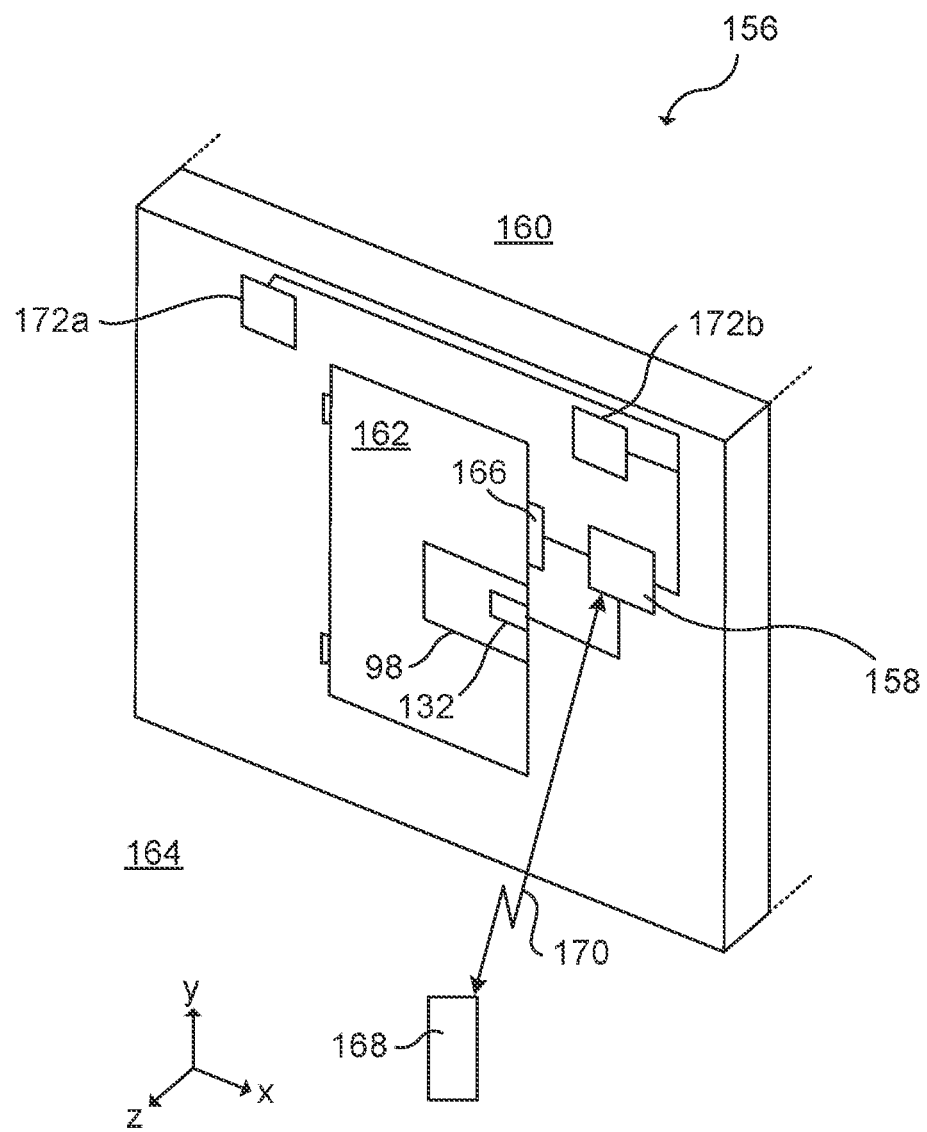
FIG. 6 schematically represents an environment in which embodiments presented herein can be applied.

FIG. 6 schematically represents an environment in which embodiments presented herein can be applied. More specifically, FIG. 6 shows an electronic locking system 156 comprising the assembly 98 according to the present disclosure and an electronic access control device 158. The access control device 158 is powerable by the electric generator 132 of the assembly 98.

Access to a physical space 160 is restricted by a movable access member 162 which is selectively unlockable. The movable access member 162 is positioned between the restricted physical space 160 and an accessible physical space 164. Note that the accessible physical space 164 can be a restricted physical space in itself, but in relation to the access member 162, the accessible physical space 164 is accessible. The movable access member 162 can be a door, gate, hatch, cabinet door, drawer, window, etc.

The electronic access control device 158 is arranged to unlock the access member 162. The access control device 158 is connected to a physical lock 166, which is controllable by the access control device 158 to be set in an unlocked state or locked state.

The access control device 158 communicates with a portable key device 168 over a wireless interface 170 using a plurality of antennas 172a-b. The portable key device 168 is any suitable device portable by a user and which can be used for authentication over the wireless interface 170. The portable key device 168 is typically carried or worn by the user and may be implemented as a mobile phone, smartphone, key fob, wearable device, smart phone case, RFID (Radio Frequency Identification) card, etc. In FIG. 6, two antennas 172a-b can be seen. However, only one antenna or more than two antennas may be provided in connection with the access control device 158. Using wireless communication, the authenticity and authority of the portable key device 168 can be checked in an access control procedure, e.g. using a challenge and response scheme, after which the access control device 158 grants or denies access.

When the access control procedure results in granted access, the access control device 158 sends an unlock signal to the lock 166, whereby the lock 166 is set in an unlocked state. In this embodiment, this can e.g. imply a signal over a wire-based communication, e.g. using a serial interface (e.g. RS485, RS232), Universal Serial Bus (USB), Ethernet, or even a simple electric connection (e.g. to the lock 166), or alternatively using a wireless interface.

When the lock 166 is in an unlocked state, the access member 162 can be opened and when the lock 166 is in a locked state, the access member 162 cannot be opened. In this way, access to a restricted physical space 160 can be controlled by the access control device 158.

While the present disclosure has been described with reference to exemplary embodiments, it will be appreciated that the present invention is not limited to what has been described above. For example, it will be appreciated that the dimensions of the parts may be varied as needed. Accordingly, it is intended that the present invention may be limited only by the scope of the claims appended hereto.

What is claimed is:

1. An assembly for an electronic locking system, the assembly comprising:
    a stationary structure;
    a shaft arranged to rotate within the stationary structure about a rotational axis; and
    a release mechanism arranged to release a spring force induced by rotation of the shaft to an output member;
    wherein the shaft extends through the stationary structure along the rotational axis such that a handle can be fixed to the shaft at each side of the stationary structure.

2. The assembly according to claim 1, wherein the output member and the release mechanism are accommodated within the stationary structure.

3. The assembly according to claim 1, wherein the output member is rotationally coupled to the shaft such that the output member can rotate relative to the shaft about the rotational axis.

4. The assembly according to claim 1, wherein the assembly comprises a spring arranged to store mechanical energy from rotational displacement of the shaft about the rotational axis from a starting position.

5. The assembly according to claim 4, wherein the release mechanism is arranged to release energy stored in the spring to a rotation of the output member.

6. The assembly according to claim 1, wherein the assembly comprises a handle fixed to each side of the shaft, and wherein the release mechanism is arranged to release the output member independently by each handle.

7. The assembly according to claim 1, further comprising an electric generator having a rotor, wherein a rotation of the output member is transmitted to a rotation of the rotor to generate electric energy.

8. The assembly according to claim 7, wherein the electric generator is hollow and the shaft passes therethrough along the rotational axis.

9. The assembly according to claim 8, wherein the spring extends through an electric generator, the electric generator having a rotor, wherein a rotation of the output member is transmitted to a rotation of the rotor to generate electric energy.

10. The assembly according to any of claims 6 to 9, wherein the electric generator is accommodated within the stationary structure.

11. The assembly according to claim 7, further comprising a freewheel mechanism arranged to drive the rotor.

12. The assembly according to claim 11, wherein the freewheel mechanism comprises a drive member, and wherein the output member is arranged to drive the drive member.

13. The assembly according to claim 11, wherein the freewheel mechanism is hollow and the shaft passes therethrough along the rotational axis.

14. The assembly according to claim 11, wherein the freewheel mechanism is accommodated within the stationary structure.

15. An electronic locking system comprising an assembly according to claim 1.

\* \* \* \* \*